Patented Feb. 13, 1940

2,190,501

UNITED STATES PATENT OFFICE 2,190,501

PRODUCTION OF ALCOHOLS

Benjamin T. Brooks, Old Greenwich, Conn., assignor to Standard Alcohol Company

No Drawing. Application December 4, 1936, Serial No. 114,135

6 Claims. (Cl. 260—639)

This invention relates to improvements in the production of alcohols. In the production of alcohols by treating hydrocarbon mixtures containing olefines, generally of 15-35% olefine content, with sulfuric acid, it is difficult, or in many cases practically impossible to produce an acid product containing more than one mol of combined olefine to one mol of sulfuric acid.

In treating lean gas mixtures, if excess gas is passed through the acid after dialkyl sulfate (diethyl or diisopropyl) begins to be formed, the dialkyl sulfate may be volatilized in the stream of excess gas, as in sulfating ethylene at low pressures, or the disulfate may be dissolved in the polymer or tar formed, as may be the case in sulfating propylene.

The dialkyl sulfates of the ethylene homologues are freely soluble in hydrocarbon oils, differing from diethyl sulfate in this respect.

In treating hydrocarbon mixtures containing butenes and/or amylenes, it is common practice to treat with sulfuric acid in proportions which result essentially in the formation of mono-alkyl sulfate. The acid product formed contains mono-alkyl sulfate and uncombined sulfuric acid. Thus, in the manufacture of butyl and amyl alcohols, the proportion of acid used to olefine combined is more than one mol of acid to one mol of combined olefine, resulting in the use of 12 to 16 pounds of acid to one gallon of alcohol produced.

Hydrocarbon mixtures made by cracking contain isomeric butenes and amylenes, together with 60% or more of paraffins, in the $C_4$ and $C_5$ fractions. When the proportion of acid used is diminished in the attempt to produce dialkyl (dibutyl and diamyl) sulfates, I find that (1) the reactivity of butyl or amyl hydrogen sulfate for the normal butenes and amylenes is much less than sulfuric acid (80 to 93% $H_2SO_4$ commonly used); (2) that the dialkyl (dibutyl and diamyl) sulfates are freely soluble in the excess naphtha and to a large extent passes into solution in the naphtha; (3) since polymers are formed, it is impossible to isolate the dialkyl sulfates by distilling or evaporating the excess naphtha, even if it were practical to do so.

According to this invention, it was found that if acid products are made in the usual way, containing somewhat less than one mol of combined olefine to one of acid, separated from excess hydrocarbon gas or naphtha and polymer, excess olefine in a concentrated or pure form may then be combined with the acid product to form an acid reaction product rich in dialkyl sulfate. The acid reaction product thus obtained may be diluted with water to precipitate and remove dialkyl sulfate, or the acid mixture diluted with water may be hydrolyzed and distilled to produce alcohols. This procedure results in less acid used per gallon of alcohol than in former practice.

The olefines used in the second sulfating step may be obtained from any suitable source. In the case of ethylene, the separation of ethylene from accompanying gases, such as hydrogen, methane and ethane, is expensive. By the procedure here described, one-half of the ethylene may be extracted from relatively lean gas, containing up to about 30% ethylene and the second step be carried out with a gas richer in ethylene or with substantially pure ethylene.

In the case of propylene, the first step may be carried out with a relatively lean gas and the second step with concentrated propylene, as for example the propylene formed in the production of isopropyl ether from isopropyl sulfate.

In the case of the butenes and amylenes, an acid containing somewhat less than one mol of butene or amylene to one mol of sulfuric acid may be made by treating suitable fractions of cracked naphtha, the acid product separated then treated with butene or amylene obtained in hydrolyzing and distilling acid alkyl sulfate solutions.

It is possible to separate butenes and amylenes from cracked naphtha fractions containing these olefines by solvent extraction of the naphtha fractions, either in the liquid or gaseous state, since the olefines are more soluble in most organic solvents than the accompanying paraffins. For example, naphtha fractions of $C_4$, $C_5$ and $C_6$ hydrocarbons, preferably close cut fractions of hydrocarbons containing the same number of carbon atoms in the molecule, are treated with a solvent, such as liquid $SO_2$, acetone, alcohol (ethyl, isopropyl, butyl, etc.) aniline, phenol, furfural, and the like, in which the olefine is more soluble than the paraffin. The olefine fraction thereby contained is substantially free from paraffins, or a fraction containing at most 30% paraffins is used according to this process.

The acid strengths preferred for obtaining an acid product rich in diethyl sulfate are above 90% $H_2SO_4$ and temperatures above 75° C.; for propylene acid strengths of 85 to 92% $H_2SO_4$ and temperatures of 15 to 30° C.; for butenes and amylenes the preferred acid concentrations are 80–90% H₂SO₄ and temperatures of 15–25° C.

Normal butenes and amylenes are very soluble in the acid product made by reacting butenes and normal pentenes with 82 to 92% sulfuric acid at 15° to 25° C. in the ratio of 1:1 mols. At this temperature, the reaction of the dissolved olefines with the mono-alkyl sulfates to form dialkyl sulfates proceeds substantially without polymerization or side reaction and no difficulty of controlling the temperature is had.

It is not the intention to limit this invention according to any theory of manufacturing alcohols from olefine hydrocarbons.

I claim:

1. Improvements in the process of manufacturing alcohols which comprises reacting a hydrocarbon mixture containing less than 30% of olefines with an acid hydrolyzing material to form acid esters containing less than 1 mol of combined olefin to 1 mol of the acid, separating any polymers that may be formed and contacting the residual acid liquor with a hydrocarbon mixture containing at least 30% of olefines.

2. Improvements in the process of manufacturing ethyl alcohol which comprises contacting a hydrocarbon mixture containing not over 30% of ethylene with sulfuric acid of 90% concentration, separating any polymers that may be formed and contacting the resulting separated acid liquor with a hydrocarbon mixture containing at least 30% of ethylene.

3. Improvements in the process of manufacturing ethyl alcohol according to claim 2 in which ethylene is contacted with 90% sulfuric acid at a temperature above 75° C. and not over 150° C.

4. Improvements in the process of manufacturing isopropyl alcohol which comprises contacting a hydrocarbon mixture containing not over 30% of propylene with sulfuric acid of 85 to 92% concentration, separating any polymers that may be formed and contacting the resulting separated acid liquor with a hydrocarbon mixture containing at least 30% of propylene.

5. Improvements in the process of manufacturing secondary butyl alcohol which comprises contacting a hydrocarbon containing less than 30% of butenes with sulfuric acid of 80–90% concentration in which the temperature is maintained at 15° to 25° C., separating any polymers that may be formed and contacting the resulting separated acid liquor with a hydrocarbon mixture containing at least 30% of butenes.

6. Improvements in the process of manufacturing isopropyl alcohol which comprises contacting a hydrocarbon mixture containing not over 30% of propylene with sulfuric acid of 85 to 92% concentration, separating any polymers that may be formed, contacting the resulting separated acid liquor with a hydrocarbon mixture containing at least 30% of propylene, and maintaining a temperature of 15° to 30° C. throughout the process.

BENJAMIN T. BROOKS.